US011158252B2

(12) United States Patent
Nakano

(10) Patent No.: US 11,158,252 B2
(45) Date of Patent: Oct. 26, 2021

(54) CIRCUIT BOARD AND DISPLAY DEVICE

(71) Applicant: JOLED INC., Tokyo (JP)

(72) Inventor: Yutaka Nakano, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 16/456,399

(22) Filed: Jun. 28, 2019

(65) Prior Publication Data

US 2020/0051498 A1 Feb. 13, 2020

(30) Foreign Application Priority Data

Aug. 8, 2018 (JP) ............................ JP2018-149688

(51) Int. Cl.

*G06F 3/038* (2013.01)
*G09G 5/00* (2006.01)
*G09G 3/3233* (2016.01)
*G09G 3/3275* (2016.01)
*G09G 3/3266* (2016.01)

(52) U.S. Cl.

CPC ......... *G09G 3/3233* (2013.01); *G09G 3/3266* (2013.01); *G09G 3/3275* (2013.01); *G09G 2330/021* (2013.01)

(58) Field of Classification Search

CPC ......... G09G 3/3233; G09G 2300/0426; G09G 2330/021

See application file for complete search history.

(56) References Cited

U.S. PATENT DOCUMENTS

2006/0001822 A1* 1/2006 Sano ................... G02F 1/13452 349/150
2006/0221014 A1 10/2006 Park et al.
2008/0259068 A1* 10/2008 Liu ....................... G02F 1/1343 345/211
2009/0179922 A1 7/2009 Kurihara et al.
2011/0164023 A1 7/2011 Ko

FOREIGN PATENT DOCUMENTS

JP 2006-285235 10/2006
JP 2009-168867 7/2009
JP 2011-141515 7/2011

OTHER PUBLICATIONS

Office Action from Japan Patent Office (JPO) in Japanese Patent Appl. No. 2018-149688, dated Jun. 23, 2020.

* cited by examiner

*Primary Examiner* — Nan-Ying Yang

(74) *Attorney, Agent, or Firm* — Greenblum & Bernstein, P.L.C.

(57) ABSTRACT

A circuit board includes: a power supply wiring board that includes a power supply circuit that outputs the power supply voltage, and a first power supply line and a second power supply line which are connected with the power supply circuit; a first wiring board that includes a first line; a second wiring board that includes a second line; a first cable that includes a first conductor that connects the first power supply line and the first line; a second cable that includes a second conductor that connects the second power supply line and the second line; and a short-circuit conductor that short-circuits the first line and the second line. An electrical length of a route from the power supply circuit to the first wiring board is shorter than an electrical length of a route from the power supply circuit to the second wiring board.

13 Claims, 8 Drawing Sheets

CIRCUIT BOARD AND DISPLAY DEVICE

CROSS REFERENCE TO RELATED APPLICATION

The present application is based on and claims priority of Japanese Patent Application No. 2018-149688 filed on Aug. 8, 2018. The entire disclosure of the above-identified application, including the specification, drawings and claims is incorporated herein by reference in its entirety.

FIELD

The present disclosure relates to a circuit board which supplies a voltage to a display panel, and a display device which includes the circuit board.

BACKGROUND

Conventionally, a display panel using, for example, an organic electroluminescent (EL) panel, is connected, via a flexible wiring board, with a printed circuit board which supplies a voltage and the like to a plurality of pixel circuits arranged in a matrix in the display panel (for example, Patent Literature (PTL) 1).

CITATION LIST

Patent Literature

PTL 1: Japanese Unexamined Patent Application Publication No. 2006-285235

SUMMARY

Technical Problem

Although the printed circuit board and the flexible wiring board described in PTL 1 enlarge as a display panel enlarges, the enlargement of the printed circuit board and the flexible wiring board is structurally difficult, and leads to a substantial increase in cost. For this reason, it is conceivable that the printed circuit board and the flexible wiring board are divided into a plurality of printed circuit boards and into a plurality of flexible wiring boards, but this may'vary the amount of a supply voltage supplied to each of the plurality of printed circuit boards. Such variation in the amount of the supply voltage leads to the luminance unevenness of the display panel.

The present disclosure has been conceived in view of the above problems, and provides a circuit board and the like which can reduce the luminance unevenness of a display panel.

Solution to Problem

In order to provide such a circuit board and the like, the circuit board according to an aspect of the present disclosure is a circuit board that supplies a power supply voltage to a display panel which includes a plurality of pixel circuits each including a light emitting element whose luminance changes according to a current supplied. The circuit board includes: a power supply wiring board that includes a power supply circuit that outputs the power supply voltage, and a first power supply line and a second power supply line which are connected with the power supply circuit; a first wiring board that includes a first line; a second wiring board that includes a second line; a first cable that connects the power supply wiring board and the first wiring board, the first cable including a first conductor that connects the first power supply line and the first line; a second cable that connects the power supply wiring board and the second wiring board, the second cable including a second conductor that connects the second power supply line and the second line; and a short-circuit conductor that short-circuits the first line and the second line, wherein an electrical length of a route from the power supply circuit to the first wiring board is shorter than an electrical length of a route from the power supply circuit to the second wiring board, the route from the power supply circuit to the first wiring board including the first power supply line and the first conductor, and the route from the power supply circuit to the second wiring board including the second power supply line and the second conductor.

In addition, in order to provide a circuit board and the like which can reduce the luminance unevenness of a display panel, a display device according to an aspect of the present disclosure includes the circuit board and the display panel.

Advantageous Effects

According to the present disclosure, a circuit board and the like which can reduce the luminance unevenness of a display panel can be provided.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Figure 1:
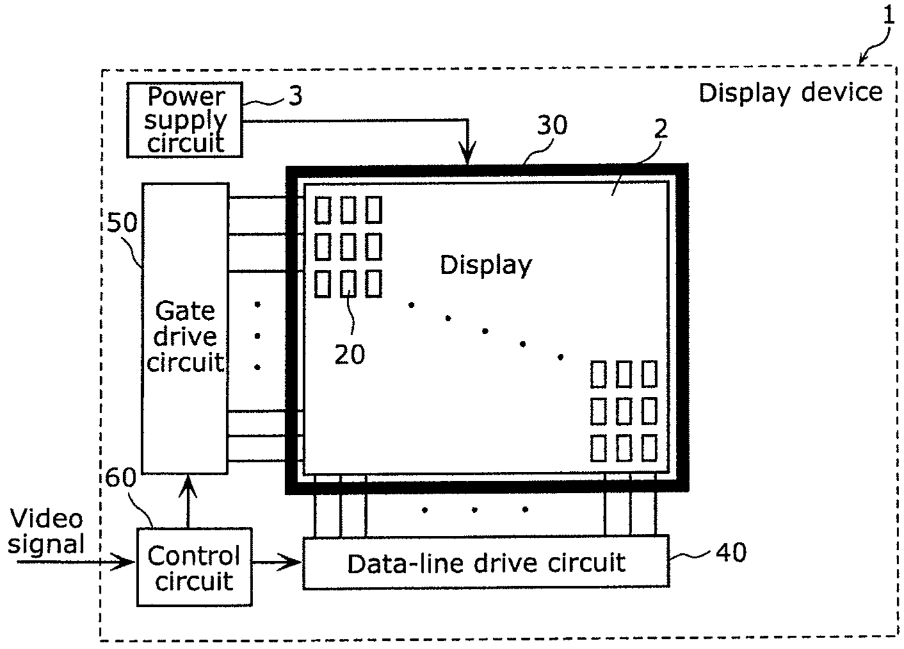
FIG. 1 is a functional block diagram illustrating a whole configuration of a display device according to Embodiment 1.

Hereinafter, embodiments according to the present disclosure will be described with reference to the drawings. The embodiments described below show specific examples according to the present disclosure. Therefore, the numerical values, shapes, materials, structural elements, the arrangement and connection of the structural elements, processes, the order of the processes, and the like described in the following embodiments are mere examples, and thus are not intended to limit the present disclosure. Accordingly, among the elements in the following exemplary embodiments, elements not recited in any of the independent claims defining the broadest concept of the present disclosure are described as optional elements.

Note that the drawings are schematic diagrams, and do not necessarily provide strictly accurate illustration. Throughout the drawings, the same sign is given to substantially the same configuration, and redundant description is omitted or simplified.

Embodiment 1

1-1. Whole Configuration of Display Device

First, a whole configuration of a display device according to this embodiment will be described with reference to the drawing.

FIG. 1 is a functional block diagram illustrating a whole configuration of a display device according to the embodiment.

A display device 1 according to the embodiment is a device which displays an image based on a video signal. As illustrated in FIG. 1, the display device 1 includes, as functions, a display 2, a power supply circuit 3, a data-line drive circuit 40, a gate drive circuit 50, and a control circuit 60.

The display 2 is a display panel in which a plurality of pixel circuits 20 each of which includes a light emitting element and a circuit element for driving the light emitting element to emit light are arranged in a matrix. Luminance of the light emitting element changes according to a current supplied to the emitting element. As the light emitting element, for example, an organic electroluminescent (EL) element, a micro light-emitting diode (LED) element, and the like can be used.

The power supply circuit 3 is a circuit which outputs a power supply voltage to be supplied to the display panel (not illustrated in FIG. 1) which includes the plurality of the pixel circuits 20. The power supply circuit 3 supplies a power supply voltage to each of the plurality of the pixel circuits 20 through a feeder 30 disposed along an outer periphery of the display 2. Note that the feeder 30 includes a plurality of power supply lines each of which supplies a different voltage to each of the plurality of the pixel circuits 20. In this embodiment, the power supply circuit 3 is realized by an integrated circuit (IC) chip.

The control circuit 60 is a circuit which supplies, to the display panel, a gradation signal corresponding to a video signal that is input. In this embodiment, the control circuit 60 controls the data-line drive circuit 40 and the gate drive circuit 50. The control circuit 60 generates, based on a video signal externally input, a gradation signal corresponding to the luminance of each of the plurality of the light emitting elements, and outputs the gradation signal that is generated to the data-line drive circuit 40.

In addition, the control circuit 60 generates, based on a synchronized signal that is input, a, control signal for controlling the gate drive circuit 50, and outputs the control signal that is generated to the data-line drive circuit 40 and the gate drive circuit 50. Specifically, the control circuit 60 includes a central processing unit (CPU) and a timing controller. In the control circuit 60, the CPU controls the timing controller based on the synchronized signal input for the timing controller to output the control signal to the data-line drive circuit 40 and the gate drive circuit 50. In this embodiment, the control circuit 60 is realized by an IC chip.

The data-line drive circuit 40 drives a data line of the display 2 based on a gradation signal generated in the control circuit 60. More specifically, the data-line drive circuit 40 outputs, based on a video signal and a horizontal synchronizing signal, a video signal voltage (data voltage) which has reflected the video signal to each of the plurality of the pixel circuits 20.

The gate drive circuit 50 drives a scan line of the display 2, based on a control signal generated in the control circuit 60, for example. More specifically, the gate drive circuit 50 outputs, based on a vertical synchronizing signal and a horizontal synchronizing signal, a scan signal and the like to each of the plurality of the pixel circuits 20 per at least display line.

1-2. Configuration of Pixel Circuit

Next, the pixel circuit 20 of the display device 1 according to this embodiment will be described with reference to FIG. 2.

Figure 2:
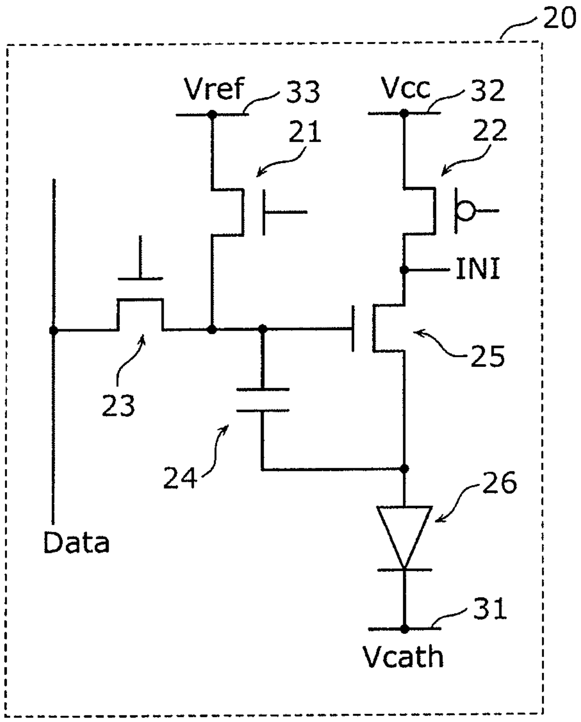
FIG. 2 is a circuit diagram illustrating an example of a circuit configuration of a pixel circuit according to Embodiment 1.

FIG. 2 is a circuit diagram illustrating an example of a circuit configuration of a pixel circuit 20 according to the embodiment.

As illustrated in FIG. 2, the pixel circuit 20 includes a data line Data, an initialization control line INI, a reference transistor 21, a validation transistor 22, a selection transistor 23, a storage capacitor 24, a drive transistor 25, and a light emitting element 26. In addition, as illustrated in FIG. 2, the pixel circuit 20 is connected with power supply lines 31 to 33. The power supply lines 31 to 33 are included in the feeder 30 as illustrated in FIG. 1. To the power supply lines 31, 32, and 33, power supply voltages Vref, Vcc, and Vcath are applied, respectively. The power supply voltage Vref, Vcc, and Vcath may be, for example, 1 V, 20 V, and about 1 V, respectively.

The data line Data is connected with the data-line drive circuit and the source terminal of the selection transistor 23. A data voltage is applied from the data-line drive circuit 40 to the data line Data.

The initialization control line INI is connected with the gate drive circuit 50 and the drain terminal of the drive transistor 25. A voltage which initializes the drain terminal of the drive transistor 25 is input from the gate drive circuit 50 to the initialization control line INI.

The reference transistor 21 is a switching transistor for applying a power supply voltage Vref to the storage capacitor 24. The power supply line 33 is connected with one of the drain terminal and the source terminal of the reference transistor 21, and the gate terminal of the drive transistor 25 is connected with the other of the drain terminal and the source terminal of the reference transistor 21. The power supply voltage Vref is applied from the power supply line 33 to the one of the drain terminal and the source terminal of the reference transistor 21. A reference sign is input from the gate drive circuit 50 to the gate terminal of the reference transistor 21. In this embodiment, the reference transistor 21 is a thin film transistor (TFT).

The validation transistor 22 is a switching transistor which switches between electrical connection and disconnection between the power supply line 32 and the drain terminal of the drive transistor 25.

The selection transistor 23 controls, by input of a selection signal from the gate drive circuit 50 to the gate terminal of the selection transistor 23, a timing to supply a data voltage of the data line Data to the gate terminal of the drive transistor 25. In this embodiment, the selection transistor 23 is a TFT. The source terminal of the selection transistor 23 is connected with the data line Data. The drain terminal of the selection transistor 23 is connected with the gate terminal of the drive transistor 25 and one of electrodes of the storage capacitor 24.

The storage capacitor 24 is for maintaining a gate voltage of the drive transistor 25. One of the electrodes of the storage capacitor 24 is connected with the gate terminal of the drive transistor 25, and the other of the electrodes of the storage capacitor 24 is connected with the source terminal of the drive transistor 25 and the anode terminal of the light emitting element 26. For example, even after the selection transistor 23 is brought into the off state, the storage capacitor 24 can maintain a gate voltage of the drive transistor 25 applied immediately before the selection transistor 23 is brought into the off state, and allows the drive transistor 25 to continuously supply a driving current to the light emitting element 26.

The drive transistor 25 is a transistor which controls a current which flows into the light emitting element 26. In this embodiment, the drive transistor 25 is a TFT. The gate terminal of the drive transistor 25 is connected with the data line Data via the selection transistor 23. The source terminal of the drive transistor 25 is connected with the anode terminal of the light emitting element 26. The drain terminal of the drive transistor 25 is connected with the drain terminal or the source terminal of the validation transistor 22. The drive transistor 25 converts a data voltage supplied to the gate terminal of the drive transistor 25 into a signal current corresponding to the data voltage, and supplies the signal current converted to the light emitting element 26.

The light emitting element 26 is an element whose luminance changes according to a current supplied, and emits light at luminance according to a data voltage. In this embodiment, the light emitting element 26 is an organic EL element. The cathode terminal of the light emitting element 26 is connected with the power supply line 31. The power supply voltage Vcath is applied to the power supply line 31. The anode terminal of the light emitting element 26 is connected with the source terminal of the drive transistor 25 and the other of the electrodes of the storage capacitor 24.

In addition, the power supply voltage Vcc is applied, from the power supply line 32, to the anode terminal of the light emitting element 26 via the validation transistor 22 and the drive transistor 25. The power supply voltage Vcath is applied from the power supply line 32 to the cathode terminal of the light emitting element 26.

Note that in the circuit configuration of the pixel circuit 20 illustrated in FIG. 2, a different circuit element, a different line, and the like may be added in a path that connects circuit elements.

1-3. Circuit Board

Figure 3:
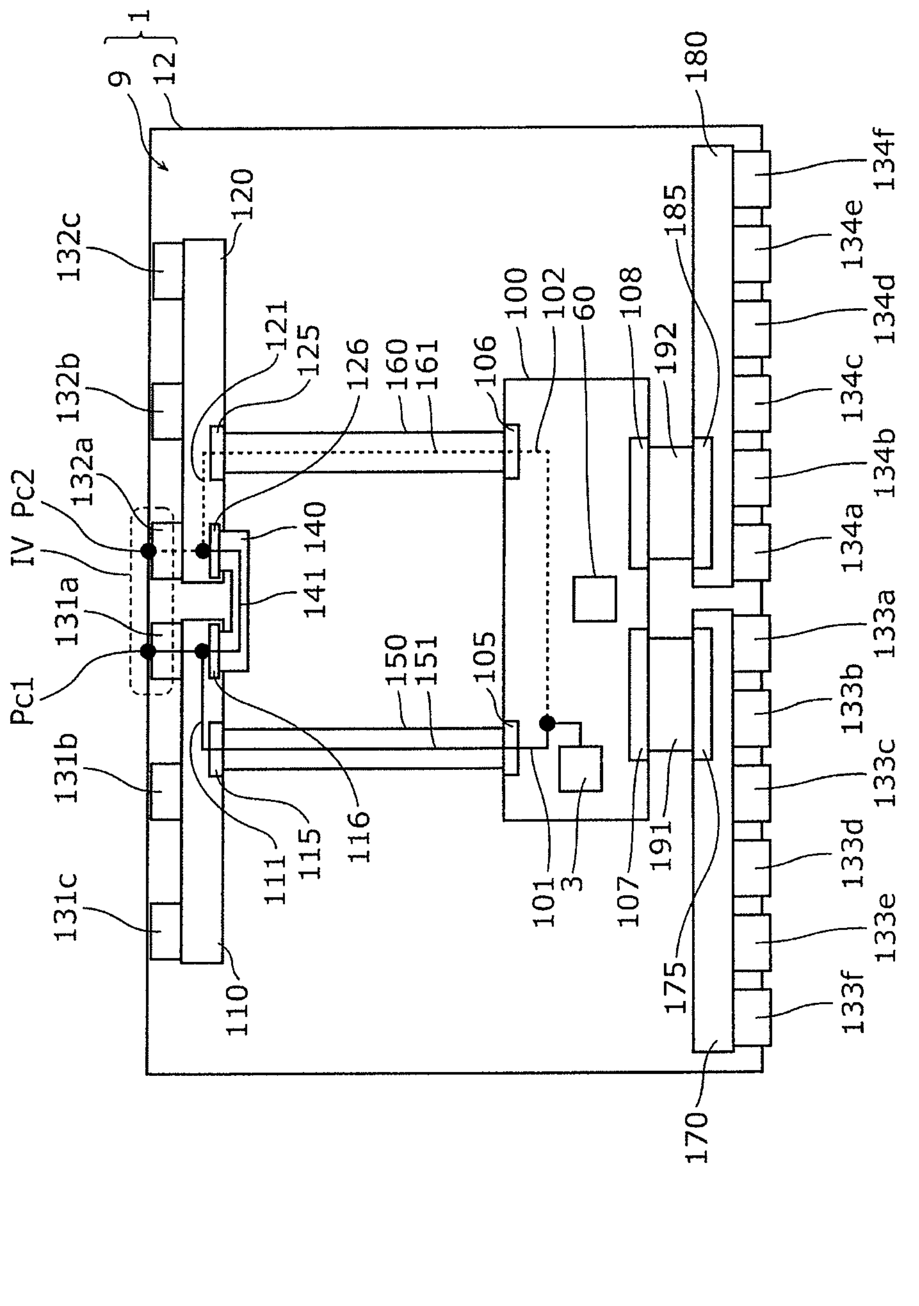
FIG. 3 is a schematic diagram illustrating a configuration of a circuit board of the display device according to Embodiment 1.
Figure 4:
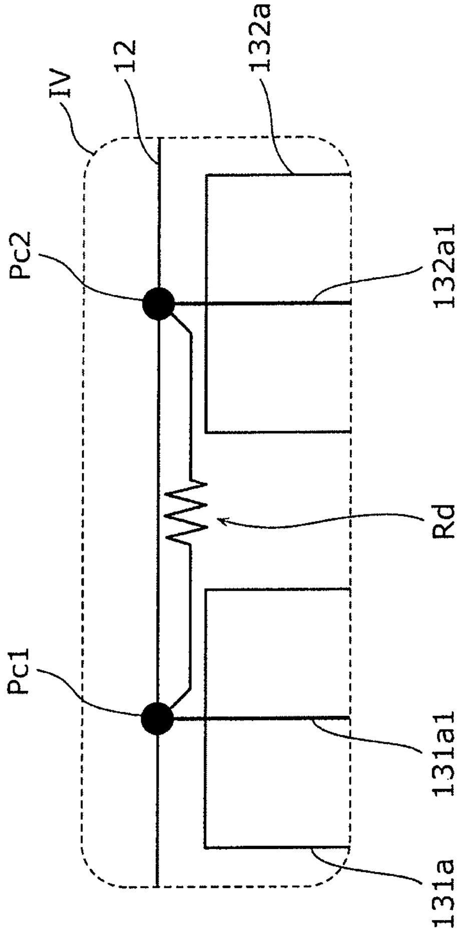
FIG. 4 is an enlarged view of the circuit board according to Embodiment 1.

A circuit board which is included in the display device 1 according to the embodiment will be described with reference to FIG. 3 and FIG. 4. FIG. 3 is a schematic diagram illustrating a configuration of a circuit board 9 of the display device 1 according to the embodiment. FIG. 3 illustrates the back side of the display surface of the display device 1. FIG. 4 is an enlarged view of the circuit board 9 according to the embodiment. FIG. 4 is an enlarged view of the inside of a broken-line frame IV illustrated in FIG. 3.

As illustrated in FIG. 3, the display device 1 according to the embodiment includes, as a structure, the circuit board 9 and a display panel 12.

The display panel 12 includes the plurality of pixel circuits 20 illustrated in FIG. 1. In this embodiment, the display panel 12 includes the display 2, the data-line drive circuit 40, and the gate drive circuit 50 which are illustrated in FIG. 1.

The circuit board 9 is a board which supplies a power supply voltage to the display panel 12 that includes the plurality of pixel circuits 20. As illustrated in FIG. 3, the circuit board 9 includes a power supply wiring board 100, a first wiring board 110, a second wiring board 120, a first cable 150, a second cable 160, and a short-circuit cable 140. In this embodiment, the circuit board 9 further includes first connection boards 131*a* to 131*c*, second connection boards 132*a* to 132*c*, a first video cable 191, a second video cable 192, a first video wiring board 170, a second video wiring board 180, first video connection boards 133*a* to 133*f*, and second video connection boards 134*a* to 134*f*.

The power supply wiring board 100 is a board that includes a power supply circuit 3 which outputs a power supply voltage, and a first power supply line 101 and a second power supply line 102 which are connected with the power supply circuit 3. In this embodiment, the power supply wiring board 100 is realized by a printed circuit board, and includes two integrated circuit (IC) chips. One of the IC chips corresponds to the power-supply circuit 3, and the other of the IC chips corresponds to a control circuit 60. In addition, the power supply wiring board 100 includes connectors 105, 106, 107, and 108 to which the first cable 150, the second cable 160, the first video cable 191, and the second video cable 192 are connected, respectively. Note that, although not illustrated, the power supply wiring board 100 further includes other lines, such as a line that connects the control circuit 60 with the connector 107 and a line that connects the control circuit 60 with and the connector 108, and a power supply IC and the like that supply power to the control circuit 60.

The power supply wiring board 100 is disposed such that the lengthwise direction of the power supply wiring board 100 is parallel with the lengthwise direction of the display panel 12. Note that the expression "parallel" used here includes not only a state in which things are completely parallel with one another, but also a state in which a difference is present when compared to the state in which things are completely parallel to one another. For example, the expression "parallel" also includes a state in which an angle between the lengthwise direction of the power supply wiring board 100 and the lengthwise direction of the display panel 12 has a difference of about five degrees or less. In addition, in the embodiment, the power supply wiring board 100 is disposed near the center of the display panel 12 in the lengthwise direction of the display panel 12.

The first wiring board 110 is a board which includes a first line 111 to which a power supply voltage is applied. In the embodiment, the first wiring board 110 is realized by a printed circuit board, and includes connectors 115 and 116. The connectors 115 and 116 are connected with the first cable 150 and the short-circuit cable 140, respectively. The first wiring board 110 may include another line different from the first line 111 printed on the first wiring board 110. In addition, as illustrated in FIG. 4, a point at which the first line 111 and the display panel 12 are connected is referred to as a first connection point Pc1. Note that the expression "the first line 111 and the display panel 12 are connected" used here includes not only a case in which the first line 111 and the display panel 12 are directly connected with each other, but also a case in which the first line 111 is connected with the display panel 12 via a conductor.

The second wiring board 120 is a board which includes a second line 121 to which a power supply voltage is applied. In the embodiment, the second wiring board 120 is realized by a printed circuit board, and includes connectors 125 and 126. The connectors 125 and 126 are connected with the second cable 160 and the short-circuit cable 140, respectively. The second wiring board 120 may include another line different from the second line 121 printed on the second wiring board 120. In addition, as illustrated in FIG. 4, a point at which the second line 121 and the display panel 12 are connected is referred to as a second connection point Pc2. Note that the expression "the second line 121 and the display panel 12 are connected" used here includes not only a case in which the second line 121 and the display panel 12 are directly connected with each other, but also a case in which the second line 121 is connected with the display panel 12 via a conductor. The second wiring board 120 and the first wiring board 110 have the same shape, and the second line 121 included in the second wiring board 120 and the first line 111 included in the first wiring board 110 have substantially the same electrical length.

The first cable 150 is a cable which connects the power supply wiring board 100 and the first wiring board 110. The first cable 150 includes a first conductor 151 that connects the first power supply line 101 and the first line 111. The first cable 150 may also include another conductor different from the first conductor 151. The first cable 150 may be a flexible, flat plate-shaped cable which includes a plurality of conductors that form the core line of the first cable 150. The first cable 150 is realized by, for example, a flexible flat cable (FFC).

The second cable 160 is a cable that connects the power supply wiring board 100 and the second wiring board 120. The second cable 160 includes a second conductor 161 that connects the second power supply line 102 and the second line 121. The second cable 160 may also include another conductor different from the second conductor 161. The second cable 160 may be a flexible, flat plate-shaped cable which includes a plurality of conductors that form the core line of the first cable 160. The second cable 160 is realized by, for example, an FFC.

The short-circuit cable 140 is a cable that includes a short-circuit conductor 141 which short-circuits the first line 111 and the second line 121. The short-circuit cable 140 connects the first wiring board 110 and the second wiring board 120. As such, by short-circuiting the first line 111 and the second line 121, it is possible to reduce the difference between a power supply voltage applied to the first line 111 and a power supply voltage applied to the second line 121. Note that the expression "short-circuiting" here means reducing the potential difference present between two conductors, and this does not limit resistance in the short-circuit conductor 141 to be zero. More specifically, a resistance value of the short-circuit conductor 141 is to be less than a resistance value of resistance present between the first connection point Pc1 and the second connection point Pc2 in the display panel 12. Here, although the first connection point Pc1 and the second connection point Pc2 are connected via a conductor layer, such as the feeder 30 included in the display panel 12, the resistance value of the resistance present between the first connection point Pc1 and the second connection point Pc2 is relatively large because the thickness of the conductor layer is small. The resistance component of the conductor layer is equivalently illustrated as resistance Rd in FIG. 4.

In addition, the short-circuit conductor 141 is disposed outside the display panel 12. Disposition of the short-circuit conductor 141 inside the display panel 12 limits the thickness of the display panel 12, thereby limiting the thickness of the short-circuit conductor 141. However, disposition of the short-circuit conductor 141 outside the display panel 12 provides a greater degree of flexibility in sizing the short-circuit conductor 141, thereby realizing the short-circuit conductor 141 having a low resistance value.

The first connection boards 131*a* to 131*c* are wiring boards which connect the first wiring board 110 and the display panel 12. As illustrated in FIG. 4, the first connection board 131*a* includes a first connection line 131*a*1 which connects the first line 111 included in the first wiring board 110 and the display panel 12. The first connection boards 131*a* to 131*c* may be flexible, flat plate-shaped boards each of which includes a plurality of conductors that form the core line of the board. Each of the first connection boards 131*a* to 131*c* is realized by, for example, a flexible printed circuit (FPC). Each of the first connection boards 131*a* to 131*c* is connected with the first wiring board 110 and the display panel 12 using, for example, an anisotropic conductive film (ACF).

The second connection boards 132*a* to 132*c* are wiring boards which connect the second wiring board 120 and the display panel 12. As illustrated in FIG. 4, the second connection board 132*a* includes a second connection line 132*a*1 which connects the second line 121 included in the second wiring board 120 and the display panel 12. The second connection boards 132*a* to 132*c* may be flexible, flat plate-shaped boards each of which includes a plurality of conductors that form the core line of the board. Each of the second connection boards 132*a* to 132*c* is realized by, for example, an FPC. Each of the second connection boards 132*a* to 132*c* is connected with the second wiring board 120 and the display panel 12 using, for example, an ACF.

The first video cable 191 is a cable which connects the power supply wiring board 100 and the first video wiring board 170, and to which a gradation signal which the control circuit 60 outputs is applied. In addition, a control signal which the control circuit 60 outputs may be applied to the first video cable 191. The first video cable 191 may be a flexible, flat plate-shaped cable which includes a plurality of conductors that form the core line of the first video cable 191. The first video cable 191 is realized by, for example, an FFC.

The second video cable 192 is a cable which connects the power supply wiring board 100 and the second video wiring board 180, and to which a gradation signal which the control circuit 60 outputs is applied. In addition, a control signal which the control circuit 60 outputs may be applied to the second video cable 192. The second video cable 192 may be a flexible, flat plate-shaped cable which includes a plurality of conductors that form the core line of the second video cable 192. The second video cable 192 is realized by, for example, an FFC.

The first video wiring board 170 is a board to which a gradation signal which the control circuit 60 outputs is applied. A control signal which the control circuit 60 outputs may be applied to the first video wiring board 170. In this embodiment, the first video wiring board 170 is realized by a printed circuit board, and includes a connector 175. The connector 175 is connected with the first video cable 191.

The second video wiring board 180 is a board to which a gradation signal which the control circuit 60 outputs is applied. A control signal which the control circuit 60 outputs may be applied to the second video wiring board 180. In this embodiment, the second video wiring board 180 is realized by a printed circuit board, and includes a connector 185. The connector 185 is connected with the second video cable 192.

The first video connection boards 133*a* to 133*f* are wiring boards which connect the first video wiring board 170 and the display panel 12. The first video connection boards 133*a* to 133*f* may be flexible, flat plate-shaped boards each of which includes a plurality of conductors that form the core line of the board. Each of the first video connection boards 133*a* to 133*f* is realized by, for example, an FPC. Each of the first video connection boards 133*a* to 133*f* is connected with the first video wiring board 170 and the display panel 12 using, for example, an ACF.

The second video connection boards 134*a* to 134*f* are wiring boards which connect the second video wiring board 180 and the display panel 12. The second video connection boards 134*a* to 134*f* may be flexible, flat plate-shaped boards each of which includes a plurality of conductors that form the core line of the board. Each of the second video connection boards 134*a* to 134*f* is realized by, for example, an FPC. Each of the second video connection boards 134*a* to 134*f* is connected with the second video wiring board 180 and the display panel 12 using, for example, an ACF.

The first wiring board 110 and the second wiring board 120 are disposed at one of edges of the display panel 12 perpendicular to the lengthwise direction of the display panel 12. In addition, the first wiring board 110 and the second wiring board 120 are disposed side by side along the lengthwise direction of the display panel 12. More specifically, the first wiring board 110 and the second wiring board 120 are disposed symmetrical to a surface perpendicular to the lengthwise direction of the display panel 12, which passes through the center of the display panel 12 in the lengthwise direction of the display panel 12. Similarly, the first cable 150 and the second cable 160 are disposed symmetrical to the surface perpendicular to the lengthwise direction of the display panel 12, which passes through the center of the display panel 12 in the lengthwise direction of the display panel 12. Accordingly, it is possible for the first cable 150 and the second cable 160 which are disposed left and right, respectively, to have the same length.

The first video wiring board 170 and the second video wiring board 180 are disposed at the other of the edges of the display panel 12 perpendicular to the lengthwise directions of the display panel 12. In addition, the first video wiring board 170 and the second video wiring board 180 are disposed side by side along the lengthwise directions of the display panel 12. More specifically, the first video wiring board 170 and the second video wiring board 180 are disposed symmetrical to the center of the display panel 12 in the lengthwise direction of the display panel 12.

1-4. Operation

An operation of the circuit board 9 according to the embodiment will be described.

First, the detailed configuration of the power supply wiring board 100 will be described.

As described above, the power supply wiring board 100 includes the power supply circuit 3 and the control circuit 60. Here, the control circuit 60 outputs a gradation signal to the data-line drive circuit 40. Since the gradation signal has a great influence on image quality, and is a signal variable in a short period of time, the distance from the control circuit 60 to the first video wiring board 170 and the distance from the control circuit 60 to the second video wiring board 180 need to be shortened as much as possible. Consequently, the control circuit 60 is disposed near the center of the display panel 12 in the lengthwise direction of the display panel 12. In other words, the control circuit 60 is disposed equidistant from the first video wiring board 170 and the second video wiring board 180. In the case of disposing the power supply wiring board 100 near the center of the display panel 12 in the lengthwise direction of the display panel 12 as described in this embodiment, the control circuit 60 is disposed near the center of the power supply wiring board 100 in the lengthwise direction of the power supply wiring board 100.

A power supply IC and the like which supply power to the control circuit 60 are disposed around the control circuit 60. In addition, since the control circuit 60 is affected by noise from the power supply circuit 3, the power supply circuit 3 is disposed isolated from the control circuit 60. Therefore, the power supply circuit 3 is disposed off the center of the power supply wiring board 100 in the lengthwise direction of the power supply wiring board 100. More specifically, in the lengthwise direction of the power supply wiring board 100, the distance between the power supply circuit 3 and the center of the power supply wiring board 100 is longer than the distance between the control circuit 60 and the center of the power supply wiring board 100. As described above, since the power supply wiring board 100 is disposed near the center of the display panel 12 in the lengthwise direction of the display panel 12 in this embodiment, the power supply circuit 3 is disposed, in the lengthwise direction of the display panel 12, off the center of the display panel 12 in the lengthwise direction of the display panel 12.

Note that an increase in the size of the power supply wiring board 100 in the up-down direction in FIG. 3 allows the power supply circuit 3 to be disposed near the center of the display panel 12 in the lengthwise direction of the display panel 12. However, in this case, the size of the power supply wiring board 100 as a whole increases, and this results in upsizing of the circuit board 9 and an increase in cost. In addition, the power supply wiring board 100 may have a rectangular shape whose longer sides extend in the up-down direction in FIG. 3. However, in this case, it is difficult to connect the power supply wiring board 100 with the first wiring board 110 and the second wiring board 120, using the first cable 150 and the second cable 160 which have linear shapes. Accordingly, the first cable 150 and the second cable 160 need to be curved, and this results in manufacturing process complexity and an increase in cost. Therefore, the power supply circuit 3 is disposed off the center of the display panel 12 in the lengthwise direction of the display panel 12.

The first cable 150 and the second cable 160 are disposed symmetrical to a flat surface perpendicular to the lengthwise direction of the power supply wiring board 100, which passes through the center of the power supply wiring board 100 in the lengthwise direction of the power supply wiring board 100. Therefore, in the lengthwise direction of the power supply wiring board 100, the distance from the power supply circuit 3 to the first cable 150 and the distance from the power supply circuit 3 to the second cable 160 are different, because the power supply circuit 3 is disposed off the center of the power supply wiring board 100. For this reason, the length of the first power supply line 101 included in the power supply wiring board 100 and the second power supply line 102 included in the power supply wiring board 100 are different. In this embodiment, the electrical length of the first power supply line 101 is shorter than that of the second power supply line 102.

In addition, as mentioned above, since the power supply wiring board 100 is disposed near the center of the display panel 12 in the lengthwise direction of the display panel 12 in this embodiment, the first cable 150 and the second cable 160 are disposed symmetrical to a flat surface perpendicular to the lengthwise direction of the display panel 12, which passes through the center of the display panel 12 in the lengthwise direction of the display panel 12. In addition, the first cable 150 and the second cable 160 have substantially the same length. Furthermore, as mentioned above, the electrical length of the first line 111 included in the first wiring board 110 and the electrical length of the second line 121 included in the second wiring board 120 have substantially the same electrical length.

As described above, the electrical length of a route from the power supply circuit 3 to the first wiring board 110 is shorter than that of a route from the power supply circuit 3 to the second wiring board 120. The route from the power supply circuit 3 to the first wiring board 110 includes the first power supply line 101 and the first conductor 151, and the route from the power supply circuit 3 to the second wiring board 120 includes the second power supply line 102 and the second conductor 161.

As such, a difficulty which results from the electrical length of the route from the power supply circuit 3 to the first wiring board 110 being shorter than that of the route from the power supply circuit 3 to the second wiring board 120 will be described with reference to a comparative example.

Figure 5:
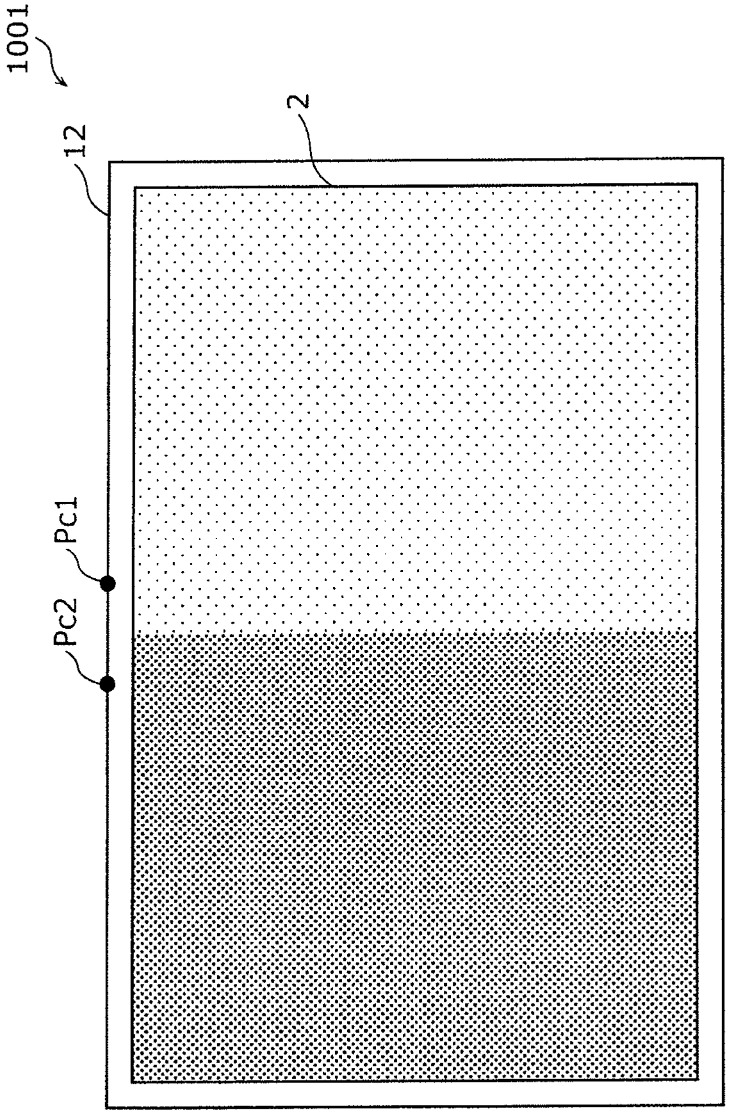
FIG. 5 is a schematic diagram illustrating luminance distribution of a display of a display device according to a comparative example.
Figure 6:
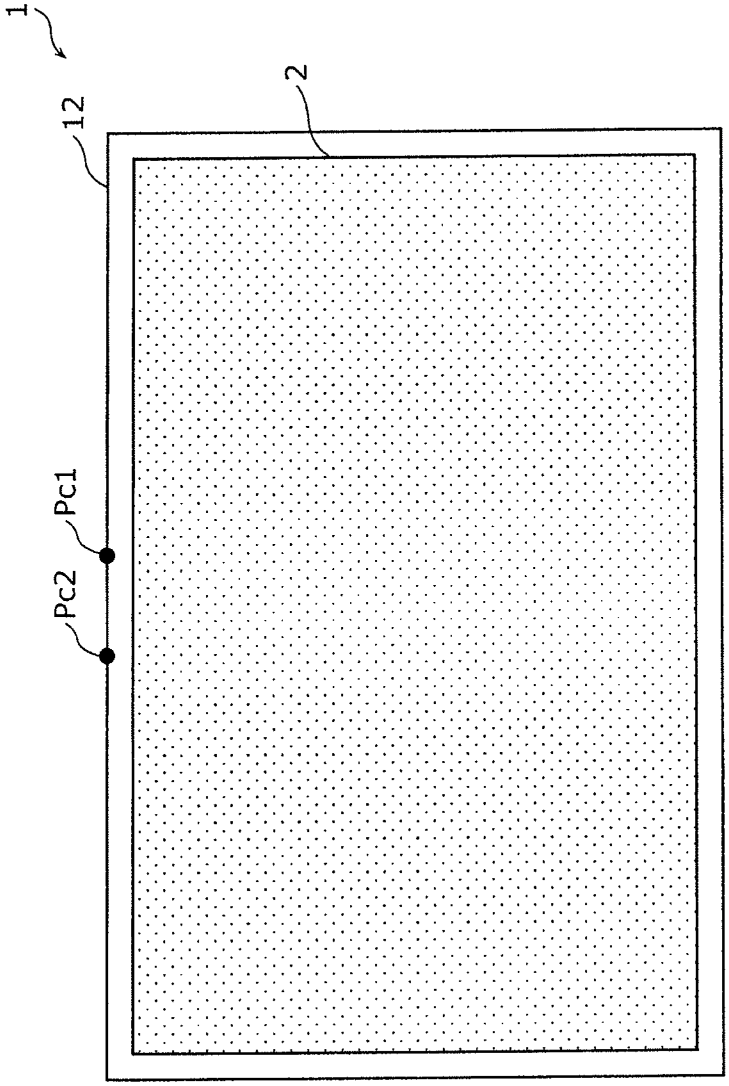
FIG. 6 is a schematic diagram illustrating luminance distribution of the display of the display device according to embodiment 1.

FIG. 5 and FIG. 6 are schematic diagrams illustrating luminance distribution of the display 2 of a display device 1001 according to the comparative example and luminance distribution of the display 2 of the display device 1, respectively. Note that the configuration of the display device 1001 according to the comparative example and the configuration of the display device 1 according to Embodiment 1 are the same, except that the display device 1001 does not include the short-circuit cable 140. Due to the fact that the electrical length of the route from the power supply circuit 3 to the first wiring board 110 is shorter than that of the route from the power supply circuit 3 to the second wiring board 120, the amount of voltage drop in a route from the power supply circuit 3 to the first connection point Pc1 is less than the amount of voltage drop in a route from the power supply circuit 3 to the second connection point Pc2. For this reason, voltage supplied to the first connection point Pc1 is higher than the voltage supplied to the second connection point Pc2. Accordingly, as illustrated in FIG. 5, luminance of the display 2 on a first connection point Pc1-side is different from luminance of the display 2 on a second connection point Pc2-side. In other words, luminance unevenness occurs in the display 2. Note that the feeder 30 electrically connects the first connection point Pc1 and the second connection point Pc2 as described above. However, since the feeder 30 has a high resistance, potential present between the first connection point Pc1 and the second connection point Pc2 cannot be equalized. A way of reducing the resistance value of the feeder 30 can be considered. However, in this case, it is necessary to enlarge the cross section of the feeder 30, thereby enlarging a frame of the display device 1001 (the periphery of the display 2 of the display device 1001 illustrated in FIG. 5).

On the other hand, in the display device 1 according to this embodiment, since the short-circuit conductor 141 short-circuits the first line 111 and the second line 121, potential present between the first line 111 and the second line 121 is reduced. With this, it reduces potential present between the first connection point Pc1 with which the first line 111 is connected and the second connection point Pc2 with which the second line 121 is connected. Accordingly, as illustrated in FIG. 6, it is possible to reduce the luminance unevenness of the display 2 as seen in the display device 1001 according to the comparative example.

Note that the above has described with a focus on only a power supply voltage which the power supply circuit 3 supplies, but the power supply circuit 3 may supply two or more power supply voltages. In order to equalize respective two or more power supply voltages supplied to the display panel 12, the circuit board 9 may include two or more short-circuit conductors 141.

1-5. Conclusion

As has been described above, the circuit board 9 according to the embodiment supplies a power supply voltage to the display panel 12 which includes the plurality of pixel circuits 20. The plurality of pixel circuits each include a light emitting element 26 whose luminance changes according to a current supplied. The circuit board 9 includes: the power supply wiring board 100 that includes the power supply circuit 3 that outputs the power supply voltage, and the first power supply line 101 and the second power supply line 102 which are connected with the power supply circuit 3; the first wiring board 110 that includes the first line 111; and the second wiring board 120 that includes the second line 121. The circuit board 9 further includes: the first cable 150 that connects the power supply wiring board 100 and the first wiring board 110, the first cable 150 including the first conductor 151 that connects the first power supply line 101 and the first line 111; the second cable 160 that connects the power supply wiring board 100 and the second wiring board 120, the second cable 160 including the second conductor 161 that connects the second power supply line 102 and the second line 121; and the short-circuit conductor 141 that short-circuits the first line 111 and the second line 121. The electrical length of a route from the power supply circuit 3 to the first wiring board 110 is shorter than that of a route from the power supply circuit 3 to the second wiring board 120. The route from the power supply circuit 3 to the first wiring board 110 includes the first power supply line 101 and the first conductor 151 and the route from the power supply circuit 3 to the second wiring board 120 includes the second power supply line 102 and the second conductor 161.

Accordingly, even in the case where the electrical length of the route from the power supply circuit 3 to the first wiring board 110 is shorter than that of the route from the power supply circuit 3 to the second wiring board 120, it is possible to reduce the difference in potential present between the first line 111 and the second line 121 resulting from a difference in the amount of voltage drop present between the routes. Therefore, it is possible to reduce the luminance unevenness of the display panel 12 resulting from a difference in the potential present between the first line 111 and the second line 121.

In addition, in the circuit board 9 according to the embodiment, the power supply circuit 3 may be disposed off the center of the power supply wiring board 100 in the lengthwise direction of the power supply wiring board 100.

Furthermore, in the circuit board 9 according to the embodiment, the power supply wiring board 100 includes the control circuit 60 which supplies, to the display panel 12, a gradation signal corresponding to a video signal that is input, and in the lengthwise direction of the power supply wiring board 100, a distance between the power supply circuit 3 and the center may be longer than a distance between the control circuit 60 and the center.

Moreover, in the circuit board 9 according to the embodiment, the short-circuit conductor 141 is disposed outside the display panel 12.

As such, disposition of the short-circuit conductor 141 outside the display panel 12 provides a greater degree of flexibility in sizing the short-circuit conductor 141, thereby realizing the short-circuit conductor 141 having a low resistance value.

In addition, in the circuit board 9 according to the embodiment, the first line 111 and the second line 121 are connected with the first connection point Pc1 of the display panel 12 and the second connection point Pc2 of the display panel 12, respectively, and a resistance value of the short-circuit conductor 141 may be less than a resistance value of resistance present in the display panel 12 between the first connection point Pc1 and the second connection point Pc2.

As such, by making the resistance value of the short-circuit conductor 141 lower than the resistance value of resistance present in the display panel 12 between the first connection point Pc1 and the second connection point Pc2, it is possible to assuredly reduce the difference in potential present between the first line 111 and the second line 121. Therefore, it is possible to assuredly reduce the luminance unevenness of the display panel 12 resulting from the difference in the potential present between the first line 111 and the second line 121.

In addition, the display device 1 according to the embodiment includes the circuit board 9 and the display panel 12.

Accordingly, even in the case where the electrical length of the route from the power supply circuit 3 to the first wiring board 110 is shorter than that of the route from the power supply circuit 3 to the second wiring board 120, it is possible to reduce the difference in potential present between the first line 111 and the second line 121 resulting from a difference in the amount of voltage drop present between the routes. Therefore, it is possible to reduce the luminance unevenness of the display panel 12 resulting from the difference in the potential present between the first line 111 and the second line 121.

Embodiment 2

A circuit board and a display device according to Embodiment 2 will be described. Note that the configuration of the circuit board according to this embodiment and the configuration of the circuit board 9 according to Embodiment 1 are the same, except for the configurations of a first wiring board and a second wiring board. Hereinafter, the circuit board and the display device according to the embodiment will be described with reference to FIG. 7.

Figure 7:
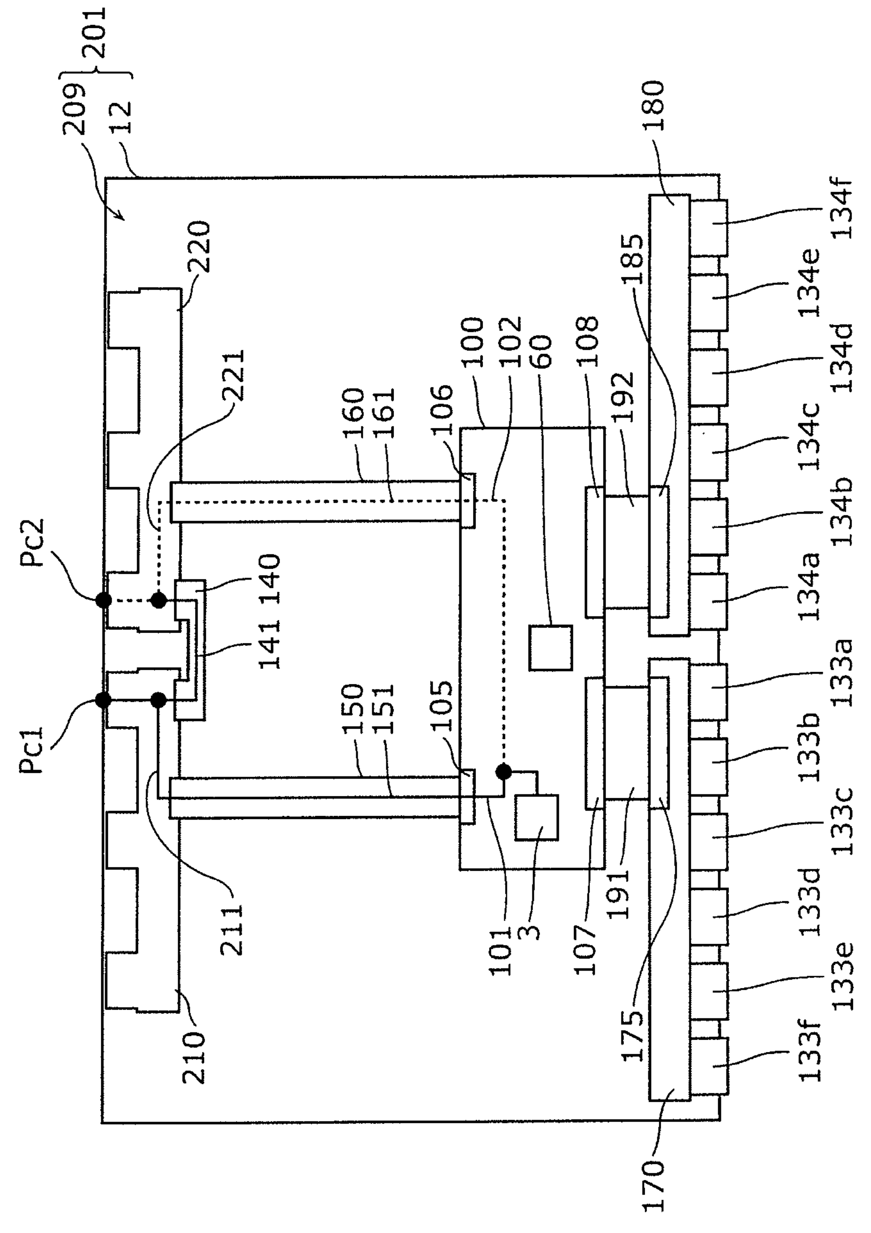
FIG. 7 is a schematic diagram illustrating a configuration of a circuit board of a display device according to Embodiment 2.

FIG. 7 is a schematic diagram illustrating a configuration of a circuit board 209 of a display device 201 according to the embodiment. FIG. 7 illustrates the back side of the display surface of the display device 201. As illustrated in FIG. 7, the display device 201 according to the embodiment includes the circuit board 209 and a display panel 12.

The circuit board 209 includes, like the circuit board 9 according to Embodiment 1, a power supply wiring board 100, a first wiring board 210, a second wiring board 220, a first cable 150, a second cable 160, and a short-circuit cable 140. In this embodiment, the circuit board 209 further includes a first video cable 191, a second video cable 192, a first video wiring board 170, a second video wiring board 180, first video connection boards 133*a* to 133*f*, and second video connection boards 134*a* to 134*f*.

The first wiring board 210 according to the embodiment is a board which includes, like the first wiring board 110 according to Embodiment 1, a first line 211 to which a power supply voltage is applied. In this embodiment, the first wiring board 210 is a flexible, flat plate-shaped board which is directly connected with the display panel 12 without using the first connection board or the like according to Embodiment 1 therebetween. The first wiring board 210 is realized by, for example, an FPC. In addition, the first wiring board 210 may be connected with each of the first cable 150, the short-circuit cable 140, and the display panel 12, using an ACF, for example.

The second wiring board 220 according to the embodiment is a board which includes, like the second wiring board 120 in Embodiment 1, a second line 221 to which a power supply voltage is applied. In this embodiment, the second wiring board 220 is a flexible, flat plate-shaped board which is directly connected with the display panel 12 without using the second connection board or the like according to Embodiment 1 therebetween. The second wiring board 220 is realized by, for example, an FPC. In addition, the second wiring board 220 may be connected with each of the second cable 160, the short-circuit cable 140, and the display panel 12, using an ACF, for example.

The above-described first wiring board 210 and the second wiring board 220 included in the circuit board 209 according to the embodiment simplify the configuration of the circuit board 201. Therefore, the circuit board 209 and the display device 201 which are thin and have a greater degree of flexibility in their shapes can be realized.

Other Embodiment

The circuit board and the like according to the present disclosure have been described based on the exemplary embodiments. However, the circuit board and the like according to the present disclosure are not limited to these exemplary embodiments. A different embodiment achieved by combining optional elements according to the exemplary embodiments, a variation obtained, without departing from the scope of the present disclosure, by making to the embodiments various modifications which may be conceived by a person skilled in the art, and various devices that includes the display device according to the exemplary embodiments are also included in the present disclosure.

For example, although the control circuit 60 drives the data-line drive circuit 40 and the gate drive circuit 50 in the above-described embodiments, the control circuit 60 may drive only the data-line drive circuit 40. In this case, a different circuit may drive the gate drive circuit 50.

Figure 8:
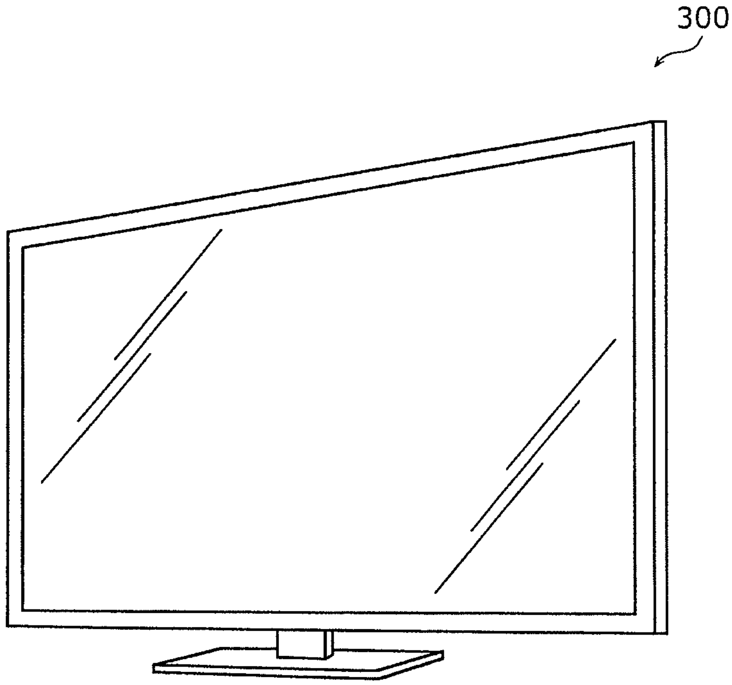
FIG. 8 is a diagram illustrating an external appearance of a thin flat screen TV that includes the display device according to the embodiments.

In addition, the display device according to the above-described embodiments is included in a thin flat TV 300 as illustrated in FIG. 8, for example. With the display device according to the above-described embodiments, a thin flat TV whose luminance unevenness is reduced can be realized.

In addition, although the circuit board includes the first wiring board and the second wiring board in the above-described embodiments, the number of wiring board which supplies a power supply voltage to the display panel 12 is not limited to the two wiring boards. The number of the wiring board may be three or more. When the number of the wiring board is three or more, the circuit board includes a short-circuit conductor which short-circuits a line included in each of the two wiring boards. Therefore, the circuit board includes two or more short-circuit conductors. In addition, in this case, the circuit board may include three or more cables each of which connects the power supply wiring board 100 and each wiring board.

In addition, although the short-circuit cable 140 includes the short-circuit conductor 141 in the above-described embodiments, the short-circuit cable 140 need not include the short-circuit conductor 141. For example, a plate-shaped conductor may be used as a short-circuit conductor.

In addition, although the first wiring board and the second wiring board are disposed at the upper edge of the display panel 12 in the above-described embodiments, the first wiring board and the second wiring board may be disposed at the lower edge of the display panel 12. In addition, although the first video wiring board 170 and the second video wiring board 180 are disposed at the lower edge of the display panel 12 in the above-described embodiments, the first video wiring board 170 and the second video wiring board 180 may be disposed at the upper edge of the display panel 12.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful for an organic EL flat-panel display, and particularly suitable for use in a large-sized display that includes a plurality of wiring boards.

The invention claimed is:

1. A circuit board that supplies a power supply voltage to a display panel which includes a plurality of pixel circuits each including a light emitting element whose luminance changes according to a current supplied, the circuit board comprising:

a power supply wiring board that includes a power supply circuit that outputs the power supply voltage, and a first power supply line and a second power supply line which are connected with the power supply circuit;

a first wiring board that includes a first line;

a second wiring board that includes a second line;

a first cable that connects the power supply wiring board and the first wiring board, the first cable including a first conductor that connects the first power supply line and the first line;

a second cable that connects the power supply wiring board and the second wiring board, the second cable including a second conductor that connects the second power supply line and the second line; and a short-circuit conductor that short-circuits the first line and the second line, wherein an electrical length of a route from the power supply circuit to the first wiring board is shorter than an electrical length of a route from the power supply circuit to the second wiring board, the route from the power supply circuit to the first wiring board including the first power supply line and the first conductor, and the route from the power supply circuit to the second wiring board including the second power supply line and the second conductor, and the first line of the first wiring board and the second line of the second wiring board are connected to the power supply circuit in common with each configured to receive the power supply voltage, with the first power supply line being directly connected to the second power supply line at an electrical node, and with the electrical node being directly connected to the power supply circuit.

2. The circuit board according to claim 1, wherein the power supply circuit is disposed off a center of the power supply wiring board in a lengthwise direction of the power supply wiring board.

3. The circuit board according to claim 1, wherein the power supply wiring board includes a control circuit which supplies, to the display panel, a gradation signal corresponding to a video signal that is input, and in the lengthwise direction of the power supply wiring board, a distance between the power supply circuit and the center is longer than a distance between the control circuit and the center.

4. The circuit board according to claim 1, wherein the short-circuit conductor is disposed outside the display panel.

5. The circuit board according to claim 1, wherein the first line and the second line are connected with a first connection point of the display panel and a second connection point of the display panel, respectively, and a resistance value of the short-circuit conductor is less than a resistance value of resistance present in the display panel between the first connection point and the second connection point.

6. A display device, comprising:

the circuit board according to claim 1; and the display panel.

7. The circuit board according to claim 1, wherein the first power supply line and the second power supply line are connected for connecting the first line of the first wiring board and the second line of the second wiring board to the power supply circuit in common.

8. The circuit board according to claim 7, wherein the first line of the first wiring board is directly connected to the power supply circuit via the first conductor and the first power supply line, and the second line of the second wiring board is directly connected to the power supply circuit via the second conductor and the second power supply line.

9. The circuit board according to claim 1, wherein an electrical length of a route from the electrical node to the first wiring board is shorter than an electrical length of a route from the electrical node to the second wiring board.

10. The circuit board according to claim 9, wherein an electrical length of the first power supply line is shorter than an electrical length of the second power supply line.

11. The circuit board according to claim 1, wherein in a plan view, the electrical node is offset from the short-circuit conductor, resulting in an electrical length of a route from the electrical node to the first wiring board being shorter than an electrical length of a route from the electrical node to the second wiring board.

12. The circuit board according to claim 11, wherein an electrical length of the first power supply line is shorter than an electrical length of the second power supply line.

13. The circuit board according to claim 12, wherein the power supply voltage is output from the power supply circuit directly to the electrical node.

* * * * *